Figure 1:
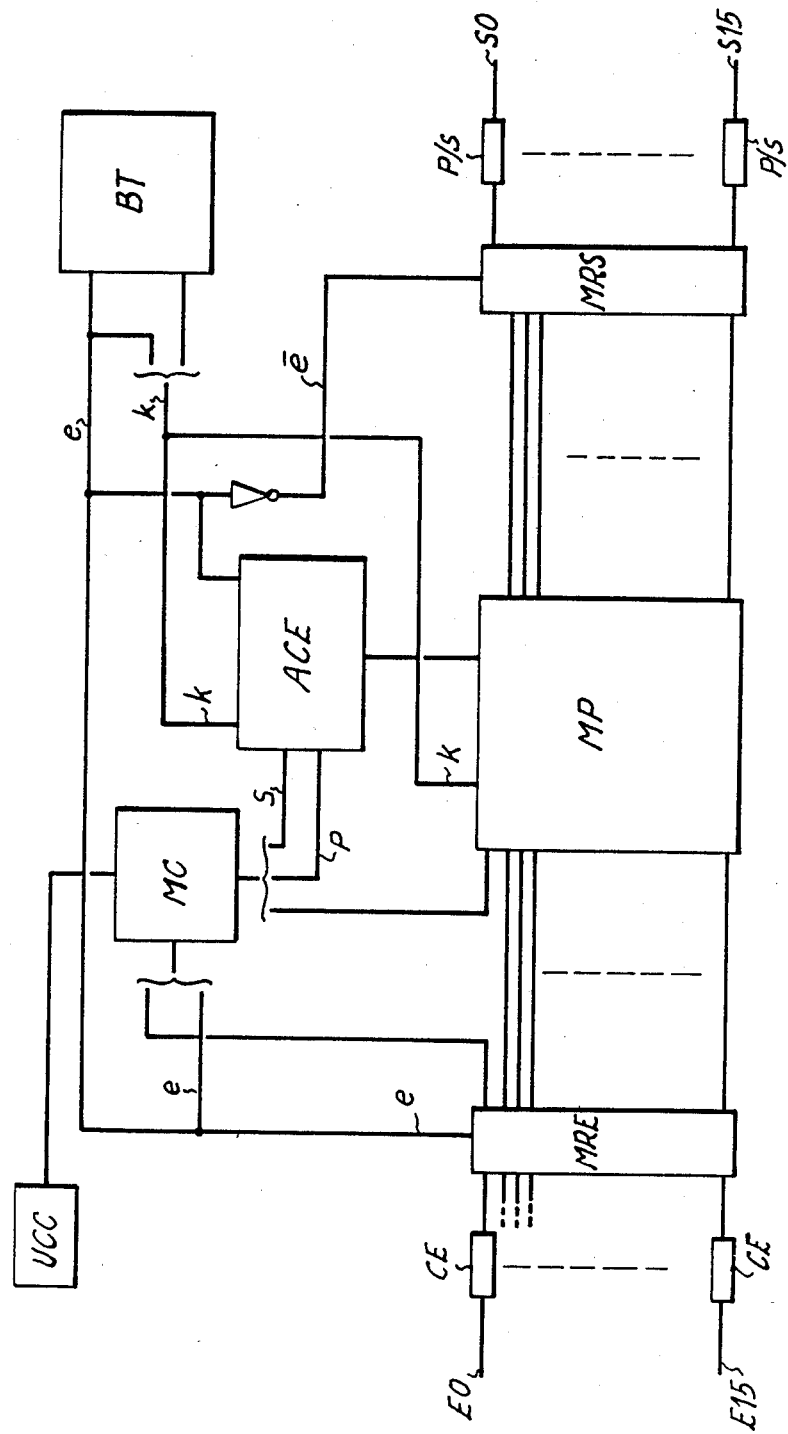

United States Patent [19]

Quinquis et al.

[11] Patent Number: 4,922,485
[45] Date of Patent: May 1, 1990

[54] SYSTEM FOR CHANGING PRIORITY OF PACKETS OF DATA

[75] Inventors: Jean-Paul Quinquis, Perros-Guirec; Michel Servel; Joël Francois, both of Lannion, all of France

[73] Assignee: L'Etat Francais, France

[21] Appl. No.: 211,381

[22] Filed: Jun. 24, 1988

[30] Foreign Application Priority Data

Jul. 16, 1987 [FR] France ................................ 87 10255

[51] Int. Cl.⁵ ............................................ H04Q 11/04
[52] U.S. Cl. ...................................... 370/60; 370/94.1
[58] Field of Search .......................... 370/60, 94, 94.1; 340/825.5, 825.51

[56] References Cited

U.S. PATENT DOCUMENTS

| | | | |
|---|---|---|---|
| 4,570,257 | 2/1986 | Olson et al. | 370/94 |
| 4,644,533 | 2/1987 | Braff et al. | 370/60 |
| 4,757,529 | 7/1988 | Glapa et al. | 370/60 |
| 4,769,811 | 9/1988 | Eckberg et al. | 370/60 |
| 4,788,679 | 11/1988 | Kataoka et al. | 370/60 |

FOREIGN PATENT DOCUMENTS 0113639 12/1983 European Pat. Off. .

Primary Examiner—Douglas W. Olms
Attorney, Agent, or Firm—Laff, Whitesel, Conte & Saret

[57] ABSTRACT

A system for switching information packets assigned with two levels of semantic priorities between entering time muliplex lines and outgoing time multiplex lines, the read address of a packet in a buffer memory of a switch being stored in a queueing file associated with an outgoing port intended to transmit the packet. The read address is accompanied by a bit which defines the priority level of the packet. Each queueing file is comprised of two zones in series between the input and the output. Means is included for writing in the first zone only when the second zone is full, the first zone is accessible only to high priority level packets between the reading of files. The rear addresses of low priority level packets, which were stored earlier than the read address of high priority level packet the oldest still being present in the file, is overwritten in equal number, at a maximum, to the number of read addresses stored in the first zone.

17 Claims, 10 Drawing Sheets

FIG. 2
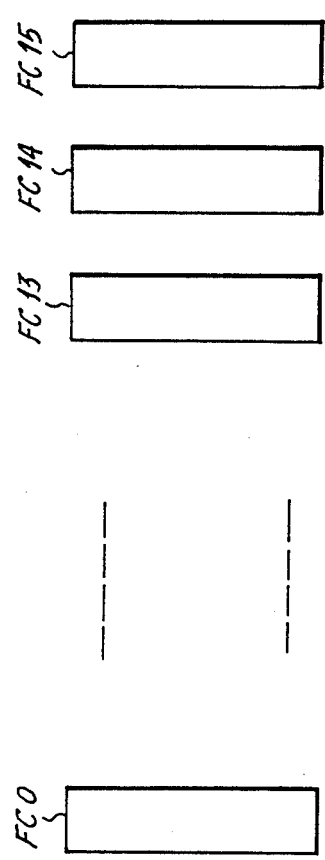
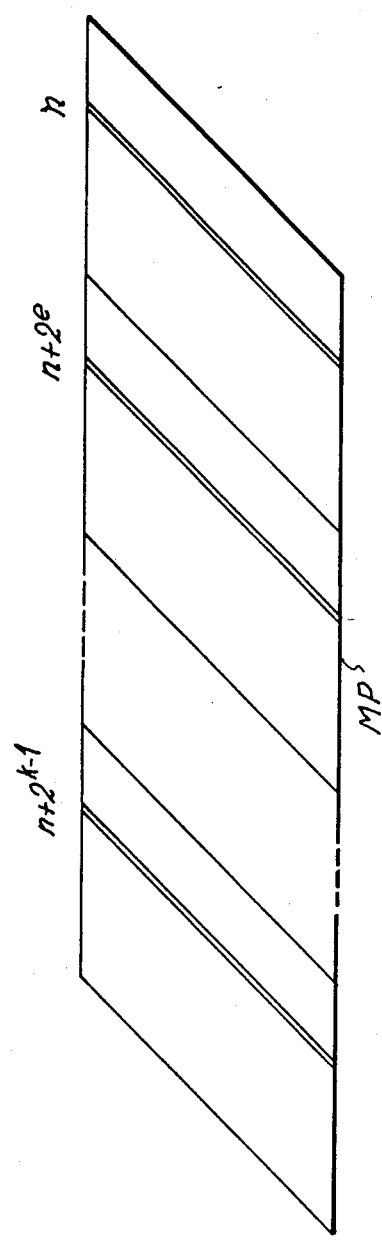

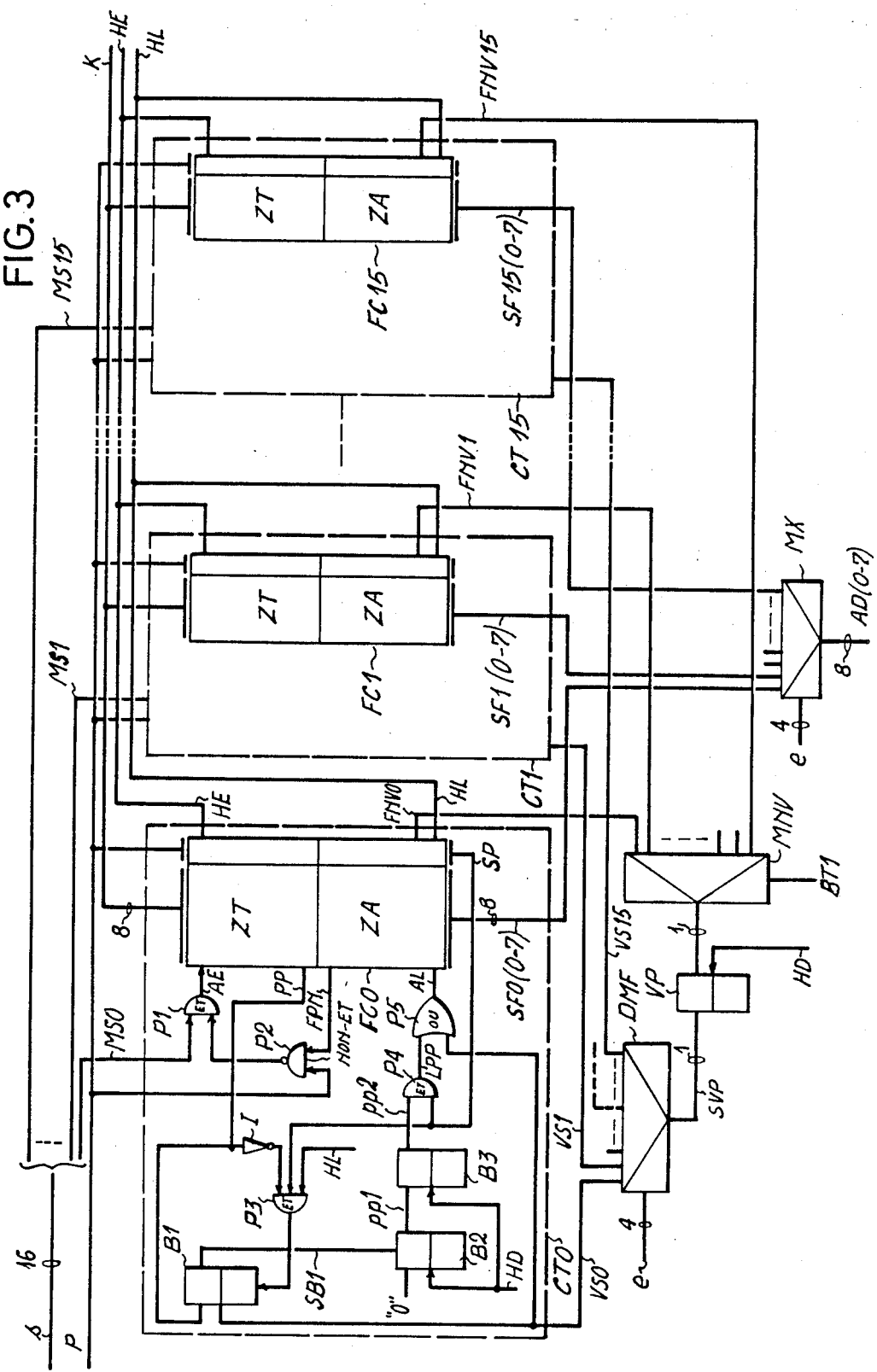

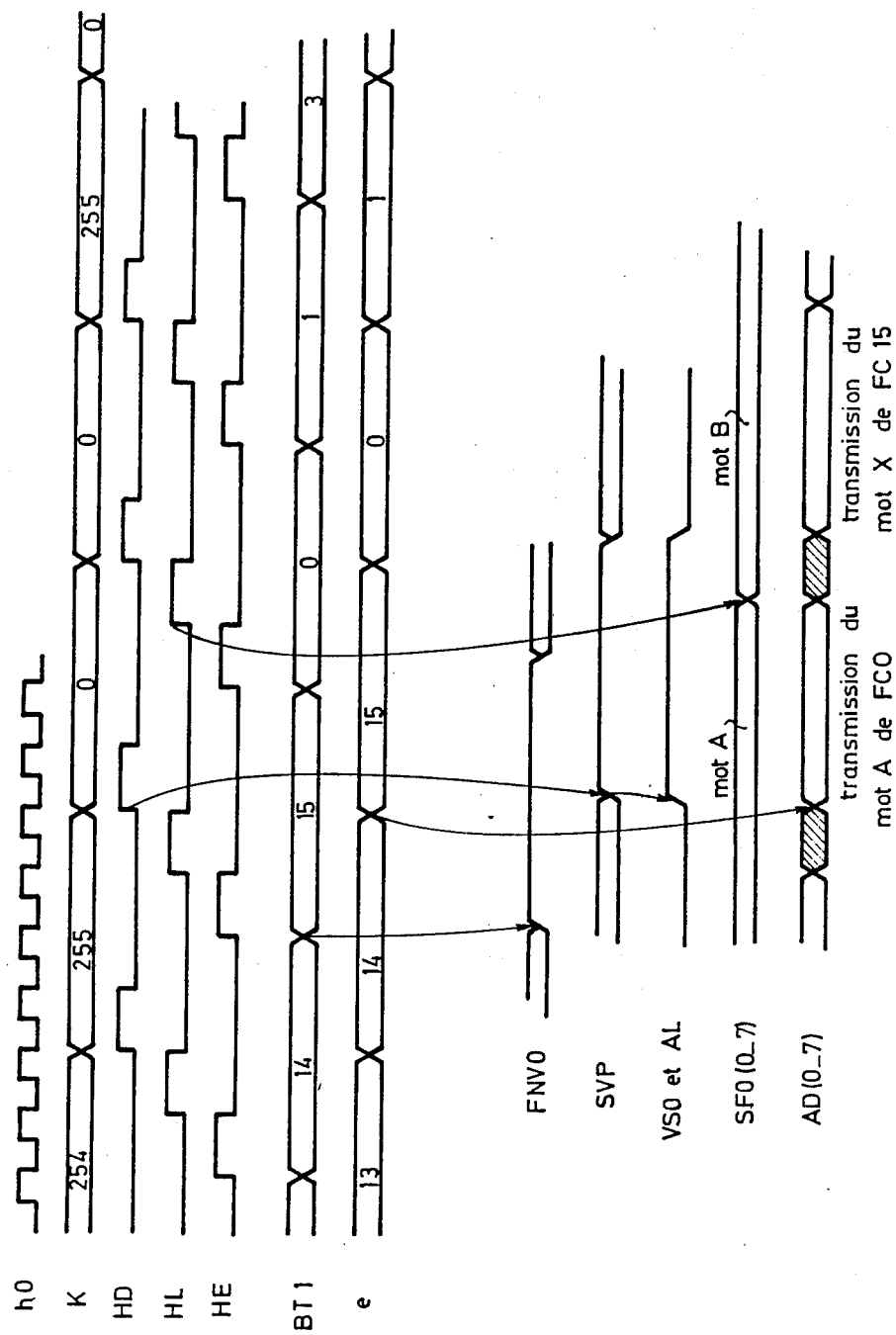

FIG.5b  FIG.6b  FIG.7b  FIG.8b  FIG.9b

FIG.4b

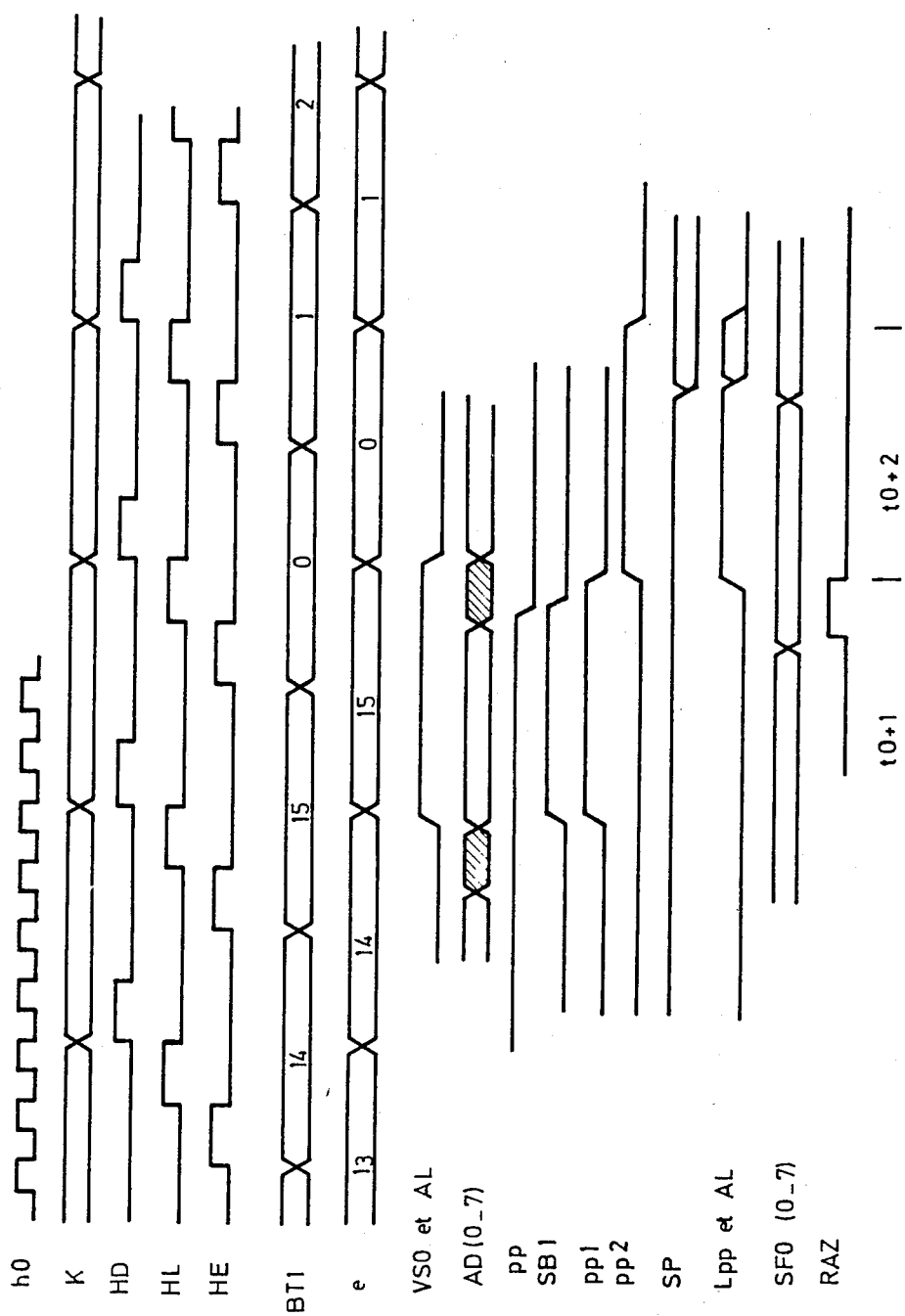

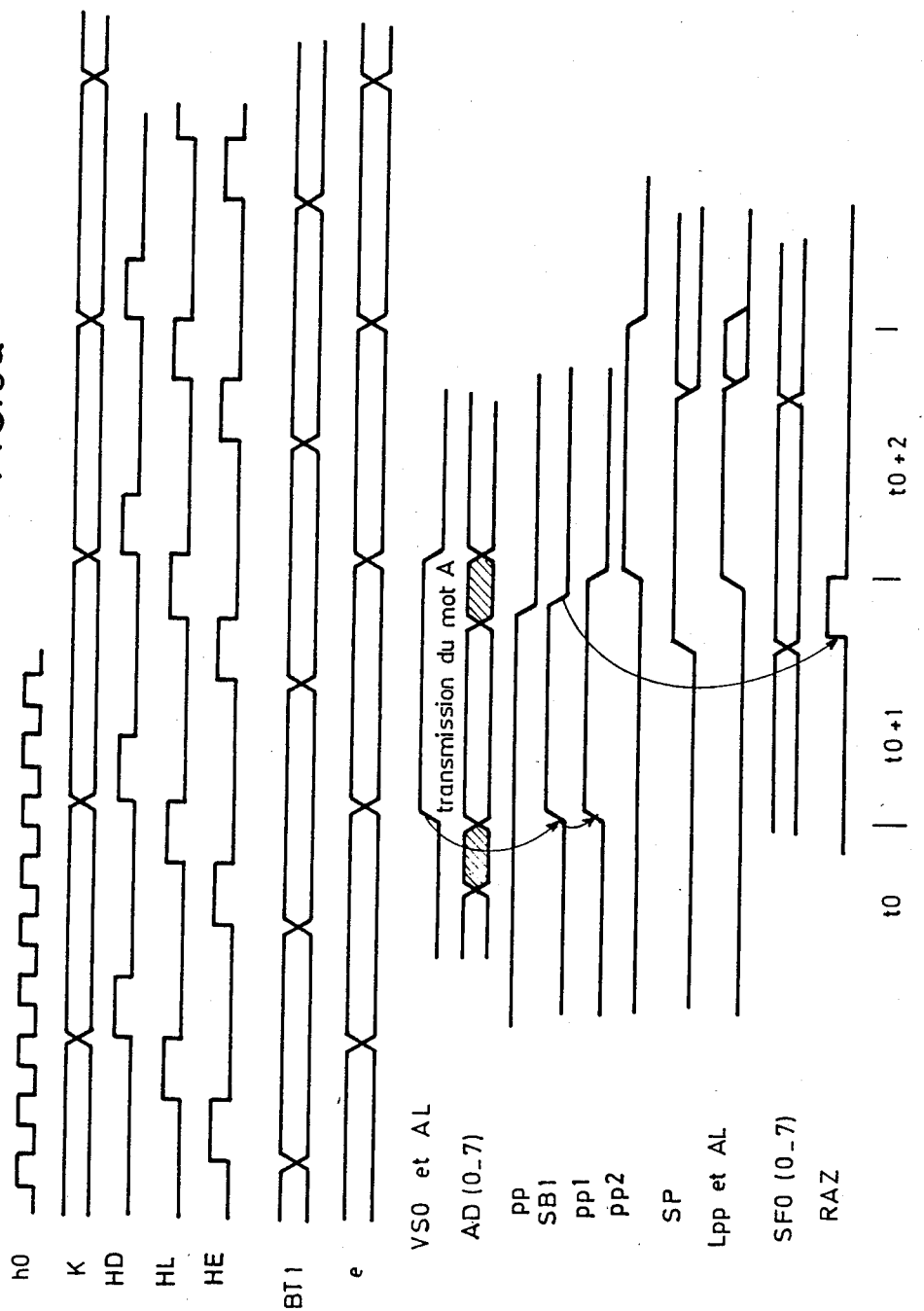

SYSTEM FOR CHANGING PRIORITY OF PACKETS OF DATA

The present invention concerns a switching system for information packets having different semantic priorities between the entering time multiplex lines and the outgoing time multiplex lines.

In an asynchronous time switching network, the information transmitted, which can be sound, data, digitized pictures or signalling messages, is forwarded in the form of packets of bits, each packet having a label providing the definition of the source from which it comes and the direction which it should be given in the network.

The switching system described in the document EP-A-O No. 113 639 is particularly suited to form each switching node in an asynchronous time division switching network. This switching system switches packets of fixed length of 128 bits and has a label of 8 bits, which are carried, for example, on sixteen entering multiplex lines to sixteen outgoing multiplex lines. The document EP-A-O No. 108 028 describes a multiplex structure segmented into equal time intervals where each packet occupies one time interval and where each time interval not carrying any information packet coming from a source is filled with an empty packet, that is a packet whose fixed label is restricted to this type of packet and cannot be used as an information packet. A particular packet of bits follows the label of an empty packet. In practice, the empty packets are used to ensure synchronization of the multiplex lines.

In the switch in the document EP-A-O No. 113 639, the packet switching function associates with each entering packet, identified by its entering multiplex line number among a number and its label, a new identification itself characterized by two attributes of the same type, that is a new label and the number of the outgoing multiplex line among a number which will deliver the packet.

In another embodiment, the packet (e, i) is switched, where e is the number of the entering multiplex and i the label, into an outgoing packet (s, j), where s is the number of the outgoing multiplex and j the new label.

In this packet switch, a first action is undertaken on the packet (e, i) before its storage in a buffer memory, this action being comprised of a "label conversion" which is carried out by a controlled memory which has been programmed during the establishment of the link, also called a virtual circuit. Thus, the label i is replaced by the label j. The packet (e, j) is thus stored in the buffer memory at a known address, a function of the writing instant defined by e. This address is stored in a queueing file associated with the outgoing multiplex line s. The system is controlled by the output and during each scanning cycle of the outgoing multiplex line, the queueing file associated with the outgoing multiplex line s is read to generate the address of the next packet that the outgoing multiplex line s will have to carry. The buffer memory thus is comprised of a set of n memory zones per entering multiplex line and the packets coming from an entering multiplex line e are written into one zone from n assigned to the entering multiplex line, the address of a packet being incremented modulo-N at each new write operation. During each set, the write operations are cyclical, that is that the ith packet will be destroyed upon writing the (i+N)th packet. A packet can thus not remain in the buffer memory any longer than N "packet durations".

The duration write control in the buffer memory is thus simple, but, in the case where the outgoing multiplex line s has a burst of traffic, that is the addressing of a number of packets much greater than the average, an entering packet may wait longer than N packet durations before being read, such that it is destroyed by the new packet entering and thus, it is lost. This incidence does not always have the same consequences depending on whether the communication is sound, pictures or messages. In fact, for example, sound, even of good quality, can tolerate a greater rate of error messages, the loss of one packet renders the message incomprehensible.

We can attempt to avoid, to some extent, this inconvenience by increasing N. However, aside from the cost due to the amount of additional memory required, we thus risk affecting other transmissions, such as the transmission of sound. In fact, to reconstruct a high quality sound, the packet transmission delay in a network must remain lower than a predetermined limit and a packet must not remain longer than a given time in each switch, which leads to selecting N not too large.

One object of the invention is to provide a system which allows overcoming of the difficulties mentioned above.

In accordance with a feature of the invention, one of two priority levels is assigned to each packet, the read address of a packet in the switch buffer memory being stored in the queueing file assigned to the outgoing port intended to transmit the packet, accompanied by one bit defining the priority level of the packet, each queueing file having in series between the input and the output two zones, writing into the first zone being only accessible to the high level priority packets when the second zone is full, and, between two readings of the file, the read addresses of the low priority packets, which had been stored earlier than the read address of the oldest high level packet still present in the file, being destroyed in numbers equal, at a maximum, to the number of read addresses stored in the first zone.

In accordance with another feature, in the case of overflow of the second zone with N read addresses into the first zone and more than N low priority level packet read addresses between the read address present at the output of the file and the oldest high priority level packet read address contained in the second zone, after the read time of the file concerned, at each of the N following bit times, the file has a shift.

In accordance with another feature, in the case of overflow of the second zone with N read addresses into the first zone and less than N low priority level packet read addresses between the present address and the output of the file, and the oldest high priority level packet read address contained in the second zone, after the read time of the file concerned, the file receives sufficient shift that the read address of the high priority level packet is present and the output of the file shifts are carried out sequentially and at the rate of the bit times after the read time.

In accordance with another feature, each file is associated with a processing circuit and has a data input for receiving, on one hand, the read address word and, on the other hand, the priority level bit, either "1" for the low level or "0" for the high level, a read enable input, a clock input, a data output generating, on one hand, the read address word and, on the other hand, the priority bit, another input to enable the shift, a read clock input, a second zone full indication output and a non-empty first zone output, the processing circuit comprising a first AND gate, one input of which receives the write enable selection signal into the file and whose second input is connected to the output of an AND gate one input of which receives the priority bit and whose other input is connected to the second zone full indication output, the output of the first AND gate being connected to the write enable input.

In accordance with another feature, the processing circuit also has an OR gate, one input of which is enabled at each reading of the file and a second input of which is connected to the output of a second AND gate one input of which is connected to the priority bit output and the other to the output of a memory circuit whose input is connected to the first zone non-empty indication output and whose zero reset input is enabled with the first zone non-empty indication output being disabled and the read address present at the output corresponding to a low priority level, the zero reset being delayed by one byte time.

In accordance with another feature, the assigning of one of the two priority levels to each packet is carried out at the same time as the input label conversion into an output label and the selection Of One or a number Of queueing files in Which is stored the read address of the packet, the bit defining the priority level being supplied by the label conversion means.

In accordance with another feature, the label conversion means supplies a priority level bit common to all queueing files in which is stored the read address of the packet.

In accordance with another feature, a label conversion means selectively supplies a high priority level bit to some of the queueing files in which is stored the packet read address, and the low priority level bit to the others.

In accordance with another feature, the loading of the control information for the conversion, the selection of the queueing and the assigning of the priority levels is carried out in the conversion means at the time of establishing the link.

The features of the above-mentioned invention, as well as others, will become clear upon reading the following description of an embodiment, the description being made in relation to the accompanying drawing in which:

FIG. 1 is a block diagram of a packet switch in accordance with the invention,

FIG. 2 is a schematic illustrating the operation of the buffer memory in the switch of FIG. 1, FIG. 3 is a schematic of the routing circuit of the switch of FIG. 1, FIGS. 4a to 9a to are timing diagrams illustrating the different operational cases of one of the control files of the routing circuit of FIG. 3, and FIGS. 4b to 9b are diagrams associated with those of FIGS. 4a to 9a respectively to illustrate how the contents of the queueing file concerned varies according to the operational case.

The switch of FIG. 1 is a type of switch described in the document EP-A-O No. 113 639, but it is distinguished by the contents of its routing circuit ACE.

The switch has sixteen input ports E0 to E15 and sixteen output ports S0 to S15 which each carry multiplexed fixed length packets, such as that which is described in document EP-A-O No. 108 028. On each of the input ports E0 to E15, is provided an input circuit CE which converts each serial byte into a parallel byte and which frames the packet starts such that from an input port to the next, the starts are generated with a delay of one byte. The output of the input circuits CE are connected to the corresponding inputs of an input rotation matrix MRE which carries out a parallel-diagonal conversion or a "paragonal" conversion. After a paragonal conversion, the labels of the packets are all generated sequentially by the first output of the input matrix MRE while the second output generates the second bytes of the packets, the third bytes, etc. Each label i, accompanied by the rank e of the entering port which carried it, is applied to the label translation memory MC which, on one hand, generates the new label j, and on the other hand, the selection information s of one or more queueing files in the routing circuit ACE. Furthermore, not present in the switch of document EP-A-O No. 113 639, the memory MC generates, towards the routing circuit ACE, a signal p in the form of a bit which is set at "1" when the packet is not of high priority and at "0" when the packet is of priority.

The output of the memory MC which generates the new label j, on eight wires, is connected to the first input of a buffer memory MP whose other inputs are connected to the corresponding outputs of the matrix MRE. The outputs of the buffer memory MP are connected to the corresponding inputs of the output rotation matrix MRS whose outputs are connected to serial parallel P/S converters respectively, whose outputs are connected to the outgoing ports S0 to S15 respectively.

The switch of FIG. 1 is comprised also of a central control unit UCC, which, in terms of the virtual circuits established in the network, supplies to the memory MC the translation information of the labels, and a time base BT which supplies, from a local bit clock, a byte clock, the word e and the word k. As an example, for a switch having sixteen input ports, the word e consists of four bits. The word k has x bits, x being greater than four. The two words e and k are generated in the time base BT by a binary counter having x stages whose first four outputs generate the word e and the set of outputs the word k, the counter being incremented at the byte clock rate. The word e carried by the link e, FIG. 1, serves to control the input rotation matrix MRE, to identify the entering ports to the memory MC, and to examine the queueing files in the routing circuit. Its inverse e/, obtained by the inverter INV carried by the link e/, is used to control the output rotation matrix MRS.

The word k is used as the write address in the buffer memory MP, this write address being stored in one of the queueing files which are selected for the information s coming from the memory MC. At the output of the memory MC, the bundle of wires transmitting the information s has as many wires as there are queueing files. In the case where one of the entering packets must be transmitted on a number of outgoing ports, the wires in the bundle s corresponding to these outgoing ports are marked. Finally, the output of the routing circuit ACE supplies the read addresses in the buffer memory MP.

FIG. 2 illustrates the diagonal arrangements of the packets stored in the buffer memory MP, the latter having sixteen rows of 2k basic memory each storing one parallel byte. It is apparent that this memory subdivides into $2^{(k-e)}$ diagonal columns, each diagonal column storing sixteen packets belonging to the sixteen entering ports respectively. Thus, for e=4, the successive packets coming from the entering port EN are stored at the addresses n, (n+16), (n+32), (n+48), ... , (n+2$^{k-1}$), respectively, then the new n, (n+16), etc.

In FIG. 2, above the buffer memory MP, is shown sixteen queueing files FC0 to FC15 in which are stored the packet read addresses. The storage of these files could not, in the switch of document EP-A-O No. 113 639, exceed $2^{k-e}$ because, after a time equal to $2^{k-e}$ times T, where T is the duration of a scanning cycle of the outgoing ports S0 to S15, all packets written in the buffer memory MP are destroyed. Note that T is equal to 16 times t0, where t0 is the period of the byte clock.

Thus the choice of the size x of word k determines the size of the memory MP. As mentioned earlier the larger the size the lesser the risk of overwriting, for the time intervals between packets on the same virtual circuit generated by the same output port can be greater and vary more, which is an inconvenience, another inconvenience resulting from the cost of the volume of additional memory. In the embodiment described, x+8, was chosen which corresponds to sixteen diagonal columns in the memory MP, this number 8 being the result of a compromise leading to an optimal efficiency of the switch.

In accordance with the invention, to reduce the probability of having priority packets being overwritten in memory MP, each file of the control circuit ACE is provided to start with words of (x+1) bits, the x first corresponding to k and the last to signal p generated by the memory MC, as shown in FIG. 1. A logic circuit is associated with each queueing file, allowing, if necessary, the ordinary packets and the prioritized packets to be processed differently as shall be seen in relation to FIG. 3.

The routing circuit ACE of FIG. 3 is comprised of sixteen identical processing circuits CT0 to CT15, a multiplexer MNV, a flip-flop VP, a demultiplexer DMF and a multiplexer MX. The circuits CT0 to CT15 are each associated with a queueing file FC0 to FC15 respectively.

With the circuits CT0 to CT15 being identical, only the circuit CT0 shall be described. The queueing file FC0 has a data input which receives the word k from the time base BT, plus the signal p from the label translation memory MC, a data output which generates the read address SF0 and a signal SP, a clocking input HE, a read clock input HL, a read enable input AE and a shift enable input AL. The output signal SP corresponds to the signal p associated with the address SF0 which is present at the data output of the file. Furthermore, the file FC0 is divided into two zones ZT and ZA, organized in series between the data input and output, and it is provided with an output FPN indicating that the zone ZA is full and an output ZT contains less than one word.

The bundle s consists of sixteen wires MS0 to MS15 which are associated with files FC0 to FC15 respectively. The wire transmitting the signal p is duplicated on the corresponding inputs of circuits CT0 to CT15. The data outputs SF0 to SF15 of files FC0 to FC15 are connected to the sixteen inputs respectively of multiplexer MX whose output generates the read address to the buffer memory MP. The outputs FNV0 to FNV15 are connected to the sixteen inputs of multiplexer MNV respectively whose output is connected to the data input of flip-flop VP whose clock input receives a signal HD. The Q output of flip-flop VP generates the signal SVP which is connected to the input of demultiplexer DMF whose sixteen outputs generate the signal VS0 to VS15 toward the circuits CT0 to CT15 respectively. The control inputs of the demultiplexer DMF and the multiplexers MNV and MX receive the signals e, BT1 and e respectively. The input terminals of demultiplexer DMF and the output terminals of multiplexer MNV and MX are connected such that the modulo sixteen incrementation of the word e generates a scanning by decreasing from 15 to 0.

The AE input of file FC0 is connected to the output of an AND gate P1, one input of which is connected to wire MS0 and the other to the output of a NAND gate P2. One input of the gate P2 is connected to wire p and the other to the output of the file. The output PP of the file is connected, on one hand, to the signal input of a flip-flop B1 and on the other hand, to the input of an inverter I whose output is connected to the first input of a three input AND gate P3 whose second input is connected to the SP output of the file and whose third input receives the signal HL. The output of gate P3 is connected to the zero reset input CLR of the flip-flop B1 whose clock input is connected to the output VS0 of demultiplexer DMF. The cue output of flip-flop B1, which transmits the signal SB1, is connected to the "1" set input of a flip-flop B2 whose signal input is at "0" and whose clock input receives the signal HD. The cue output of flip-flop B2 which transmits the signal PP1, is connected to the signal input of a flip-flop B3 whose clock input receives the signal HD. The cue output of flip-flop B3, which transmits the signal PP2, is connected to one input of an AND gate P4 whose second input receives the signal SP. The output of gate P4 is connected to an input of an OR gate P5 whose other input is connected to the output VS0 of demultiplexer DMF and whose output is connected to the shift enable input AL of file FC0.

The timing diagrams of signals HE, HL, HD, k, BT1 and e are shown in FIG. 4a, as well as in FIGS. 5a to 9a. This signal HO is a signal whose period is twice that of the switch bit clock. The signal k defines a write address varying from 0 to 255. This signal HD is at high level during the first two bit durations of a byte and at low level during the six subsequent bit durations. This signal HL is ahead by two bit durations with respect to the signal HD and the signal HE is ahead by two bit times with respect to the signal HL. the signal BT1, present on four wires, is incremented at each byte time, as the signal k, but ahead by one byte duration with respect to it. The signal e available on four wires, is incremented at each byte time and delayed by one half byte duration on the signal BT1. When the signal MS0, generated by the memory MC, is at "1", there is a request to write into the file FC0 and when it is at "0", there is no request to this file. In particular the writing when it is requested, is effected at the leading edge of the signal HE.

As shown in FIG. 3, writing is enabled for any request when the signal FPN is at "0", because the output of the NAND gate P2 is at "1", whatever is the state of the signal p. The transition to level "1" of wire MS0 thus opens gate P1 and the signal AE enables the writing of the current word k into the file, which is carried out by the signal HE whose leading edge occurs within a byte duration.

When the signal FPN is at "1", indicating that the zone ZA is full, the output of gate P2 can be at "1" only if the wire p is at "0". There will thus be write enabling (AE=1) only if the packet concerned is prioritized (P=1). Each word k corresponding to a priority packet arriving and intended for output S0 is written and shifted in file FC0 but can be found in zone ZT. The word k corresponding to non-prioritized packets will not be written into the file FC0. The contents of these non-prioritized packets in the memory MP will be lost. The signal e is a four bit word whose value varies cyclicly from 0 (0000) to 15 (1111) at the byte rate to scan the files FC15 to FC0 respectively in order to transmit read addresses to the buffer memory MP through the multiplexer MX. The signal BT1 is also a four bit word which takes on the same value as the signal e, but it is ahead by one half byte duration. We shall see below how the signal BT1 is used.

Considered below are six significant cases of filling the file FC0 in order to illustrate the processing of prioritized and non-prioritized packets in the routing circuit according with the invention. As an example, we will assume that the capacity of the active zone ZA of the file has sixteen words, the capacity of the transit zone ZT being not of concern, for example eight words.

Figures 4B, 5B, 6B, 7B, 8B, 9B:
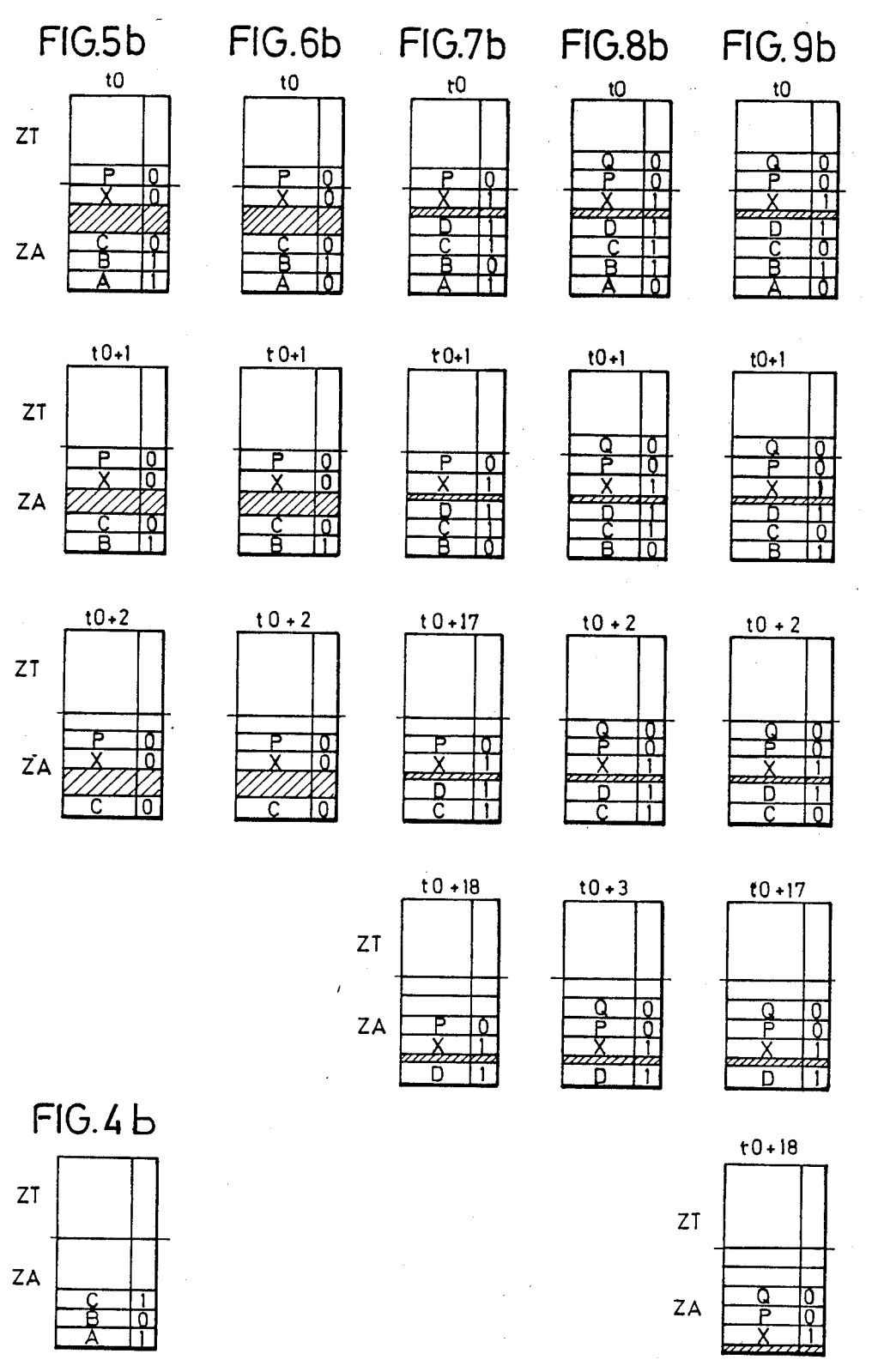

As shown in FIG. 4b, which relates to a first case of operation, we shall assume that, in the file FC0, three words A, B* and C have been sequentially written., the signal * indicating that the word considered is prioritized (this also being the case in the description of other cases). The signal FPN is thus in this case at "0" and the signal FNV0 at "1". As in all the files, the word A is available at the output of the file, which means that it is present on the wires corresponding to multiplexer MX. When the signal e which is applied to the control input of multiplexer MX, takes on the value 1111, the contents of word a is transmitted on the output AD(0-7) of multiplexer MX towards the read address input of memory MP. In other respects, at the time when the signal BT1 has taken the value 1111, the signal FNV0 has been transmitted by the multiplexer MNV to the flip-flop VP which recopies this signal at the leading edge of signal HD. The diagram of the output signal SVP of flip-flop VP is shown in FIG. 4a. When e=1111, the signal SVP, here at "1", is transmitted by the multiplexer DMF to its output VS0 connected to OR gate P5, and the signal AL goes to "1", as shown in the diagram VS0/AL of FIG. 4a, then stays at "1" during the byte duration e=1111. At the leading edge of HL, during this byte duration, a shift is done in the file and the word A is replaced by the word B*, while the word c takes second place. Thus in this first operational case, the word A has been read through the multiplexer MX, then has been removed from the file through a shift operation. The timing diagram AD(0-7) of FIG. 4a illustrates that during the byte duration e=0000, the multiplexer MX transmits the word read in the file FC15.

In FIG. 5b which illustrates with FIG. 5a a second operational case, two successive states of the file FC0 at the byte time t0 (e=14), t0+1 (e=15) and t0+2 (e=0) are represented. At time t0, the waiting zone ZA is full and contains the words A, B, C*, etc., X*, and the transit zone ZT contains a word, obviously prioritized, T*. From the timing diagram of FIG. 5a, we have also shown the succession of times t0, t0+1 and t0=2. At the transition from t0 to time t0+1, as in the previous case shown in FIGS. 4a and 4b, the word a is read through the multiplexer MX, then, towards the end of time t0+1, it is removed from the file and replaced by the word b. It is the state t0+1 of FIG. 5b.

In fact at times t0, the signal PP is at "1" as well as the signal FNV0. When e takes on the value 15, the flip-flop B1 receives the signal VS0 from multiplexer DMF and recopies the signal PP to "1", which results in also setting the flip-flop 2 to "1" by SB1. At time t0+1, at the leading edge of HL, the word a is removed from the file. At the leading edge of the next signal HD, the flip-flop B3 recopies the state PP1 of the flip-flop B3 recopies the state PP1 of the flip-flop B2, and causes the state pp2 to go to "1". At time t0+1, the word B, which has taken the place of A, not being prioritized, the signal SP is at "1" such that the gate P4, with its inputs at "1", now maintains, through OR gate P5, this signal AL at "1". Thus at the next leading edge of signal HL, that is towards the end of time t0+2, the word B is removed by the shifting of the file FC0. At the end of time t0+2, as shown in FIG. 5b, the contents of the file is C*, etc., X*, P*.

It may be seen that the word B has not passed through the multiplexer MX because at time t0+2, the signal e had the value 0 and the multiplexer MX connected the output of file SC15 to its output AD (0-7). The packet which is stored at the address b in the buffer memory MP will thus not be transmitted to the outgoing port S0. If this packet is uniquely intended for this port S0, it is lost, but if it was a packet intended to be transmitted on a number of ports other than S0, it remains available in the queueing files associated with these ports.

In other respects as soon as the word has been removed from the file SC0, the word P* goes from the transit zone ZT to the queueing zone ZA, such that the signal PP goes to "0". The output of inverter I is thus at "1", as is the signal SP, since the word b is not prioritized, such that at the next leading edge of HL, the CLR output of gate P2 resets the flip-flop B1 to "0". At the next leading edge of HD, the flip-flop B2 whose data input is at "0" recopies this state which is also recopied by the flip-flop B3 at the next leading edge of HD, that is at the end of time t0+1. Thus at the beginning of time t0+2, the zone ZT is empty and the set of flip-flops B1 and B3 is at the rest state, and the circuit CT0 can thus continue to operate as in the first case illustrated by FIGS. 4a and 4b.

At time t0+17, not shown, the word C* will normally be read through multiplexer MX and be removed by the file FC0.

In FIG. 6b, which illustrates with FIG. 6a a third operational case, we have shown three successive states of file FC0 at byte times t0 (e=14), t0+1 (e=15) and t0+2 (e=0). At times t0, the active zone ZA is full and contains one word obviously prioritized, P*. In the timing diagrams of FIG. 6a, we have also shown the succession of these times. At the transition of time t0+1, the word A* is normally read through the multiplexer MX, then, towards the end of time t0+1, is removed from the file and replaced by the word B. It is the state t0+1 of FIG. 6b.

In fact at time t0, the signal PP is at "1" as well as the signal FNV0. When e takes on the value 15, the flip-flop B1 receives the signal VS0 from demultiplexer DMF and recopies the signal PP to "1", which results in also placing flip-flop B2 to "1" through SB1. At time t0+1 on the leading edge of HL, the word A* is removed from the file. On the leading edge of signal HD following, the flip-flop B3 recopies the state PP1 of flip-flop B2 and causes the transition of the state PP2 to "1". At time t0+1, the word B which has taken the place of A*, not being prioritized, the signal SP goes to "1" such that the gate P4, with its two inputs at "1", maintains AL at "1" through gate P5. Thus, at the next leading edge of signal HL, that is towards the end of time t0+2, the word b is removed by shifting the file FC0, but it has not been transmitted by the multiplexer MX. At the end of time t0+2, the content of the file is thus C*, etc., X*, P*. At time t0+17, not shown, the word C* will normally be read through the multiplexer MX and removed from the file.

The resetting to the initial state of flip-flops B1 to B3 is carried out as in the second case described above.

The third operational case is thus practically the same as the second, except that it is useful to describe it to help the understanding of that whatever the state of the file FCi at the moment where the signal e takes on the value i, the word which is present at its output, prioritized or not, is read through the multiplexer MX and used to cause the transmission of a packet from the buffer memory MP to the outgoing port Si.

Figure 7A:
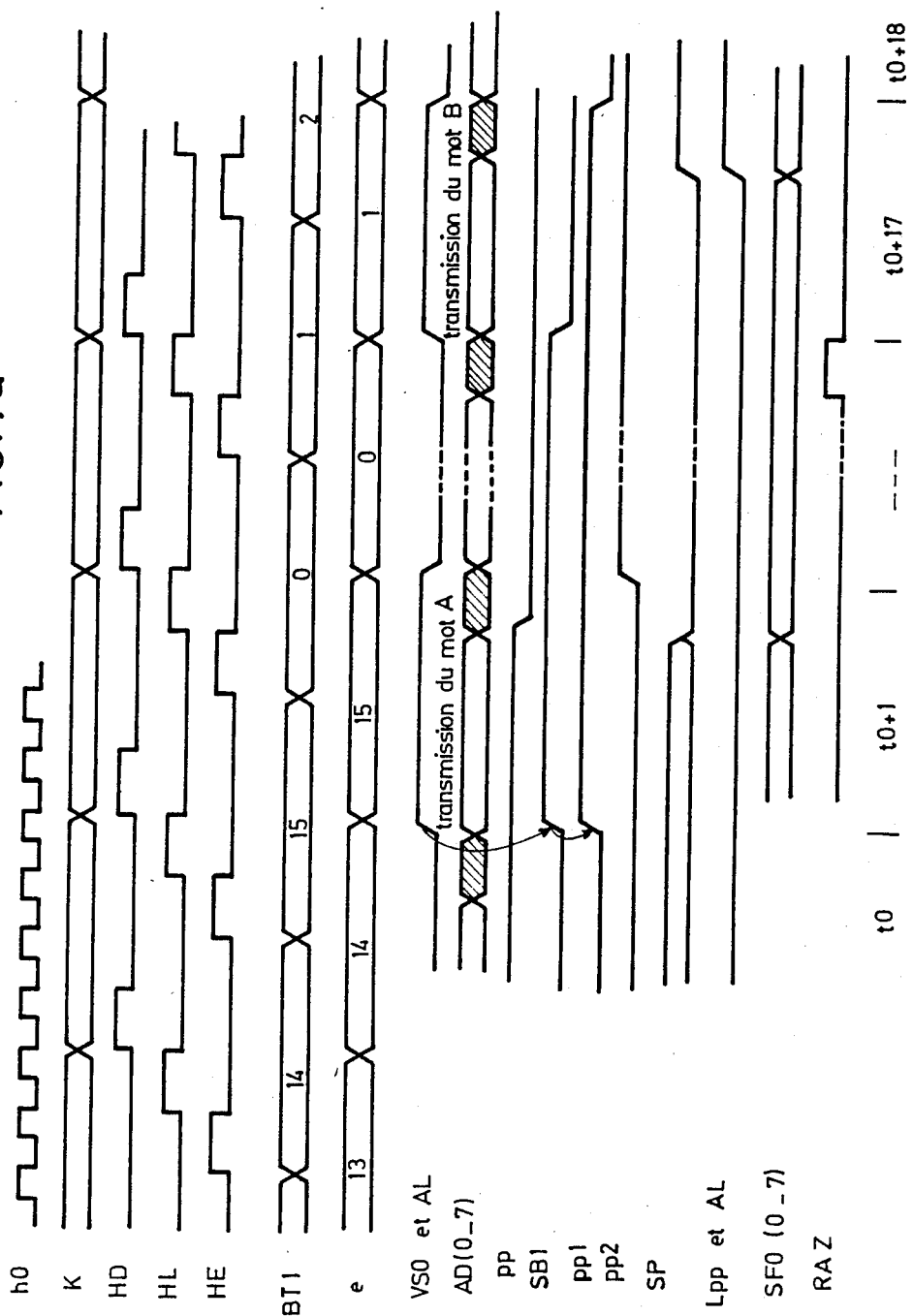

In FIG. 7b, which illustrates with FIG. 7a, a fourth operational case, we have shown four successive states of the file FC0 at byte times t0 (e=14), t0+1 (e=15), t0+17 (e=15) and t0+18 (e=0). At time t0, the active zone ZA is full and contains the words A, B*, C, D, etc., X, and the transit zone ZT contains one word, obviously prioritized, P*. In the timing diagrams of FIG. 7a, we have also shown these byte times. At the transition from time t0 to t0+1, the word A is normally read through a multiplexer MX then towards the end of time t0+1, it is removed from the file and replaced by the word B* which is prioritized.

In fact, at time t0, this signal PP is at "1" as well as signal FNV0. When e takes on the value 15, the flip-flop B1 receives this signal VS0 frOm demultiplexer DMF and recopies this signal PP at "1", which results in setting the flip-flop B2 also at "1" through SB1. At time t0+1, on the leading edge of HL, the word A is removed from the file. On the leading edge of the next signal HD, the flip-flop B3 recopies this state PP1 from the flip-flop B2 and causes the transition of state PP2 to "1". The word B*, which has taken the place of A, being prioritized, the signal SP goes to "0" such that the output gate P4 remains at "0", which, through gate P5, brings the signal AL back to "0". Thus, at the next leading edges of signal HL, up to t0+17, the word B* cannot be removed. During this time, the signal PP has come back to "0" and the first input of gate P3 is at "1", but the signal SP is at "0"; since the word D* is prioritized, the flip-flop B1 is now reset to "0" through its CLR input and the states of flip-flops B2 and B3 do not change.

At time t0+17 where e retakes the value 15, the word B* is read through the demultiplexer MX and through MNV, VP and DMF, the signal VS0 has gone to "1" which causes the removal of word B*, such that at times t0+17, the word C appears at the output of the file. If we assume that between the time t0 and the time t0+17, no word has been written in the file, we are brought back to the first operational case illustrated in FIGS. 4a and 4b. The word C is read at times t0+33, etc.

In particular at times t0+17, the signal VS0 has caused the state of flip-flop B1 to change since PP is at "0". The flip-flops B2 and B3 are thus at "0" at time t0+18.

Figure 8A:
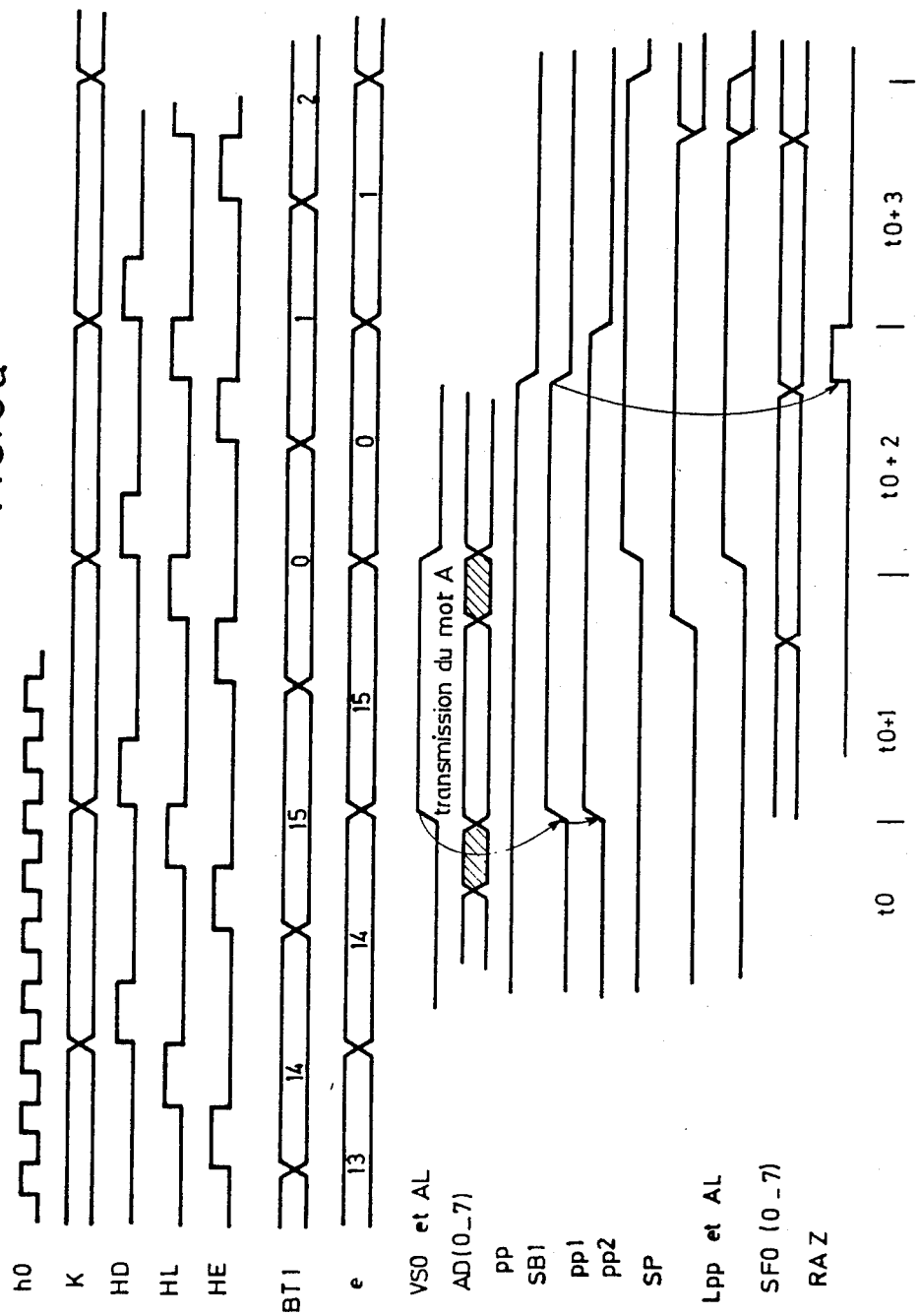

In FIG. 8b, which illustrates, with FIG. 8a, a fifth operational case, four successive states of file FC0 at byte times, t0 (e=14), t0+1 (e=15), t0+2 (e=0) and t0+3 (e=1) are shown. At time t0 the active zone ZA is full and contains the words A*, B, C, D, etc., X, and the transit zone ZT contains two words P* and Q*, was obviously prioritized. In the timing diagrams of FIG. 8a, these byte times are also shown. At the transition from time t0 to t0+1, the word A* is normally read through the multiplexer MX, then, towards the end of time t0+1 it is removed from the file by signal VS0 at "1" and replaced by the non-prioritized word B. Thus at time t0+1, the word P* by the non-prioritized word B. Thus at time t0+1, the word P* is entered into the zone ZA, but the word Q* remains in zone ZT.

In fact, at time t0, the signal PP is at "1" as well as signal FNV0. When e takes on the value 15, the flip-flop B1 recopies the signal PP at "1", which results in setting of the flip-flop B2 also at "1", then the flip-flop B3, as described above. The word B which has taken the place of A*, was not prioritized; the signal SP goes to "1", such that the gate P4 maintains the signal AL at "1". Thus at time t0+1, on the leading edge of HL, the word B is removed through shifting of the file. During this time the word Q* was constantly in the transit zone ZT, the signal PP remained at "1", which maintains the state of the flip-flop B1 and thus flip-flops B2 and B3. At time t0+3, since the word C is also not prioritized, the signal SP remains at "1" and the gate P4 continues to maintain the signal AL at "1". Thus at the leading edge of HL, the word C is also removed, without being transmitted by multiplexer MX. At the end time T0+3, the signal PP is reset to "0", since the word Q* has entered into the zone ZA. The flip-flops B1 to B3 are thus reset to the initial state as previously described and the operation continues as in the first case.

Figure 9A:
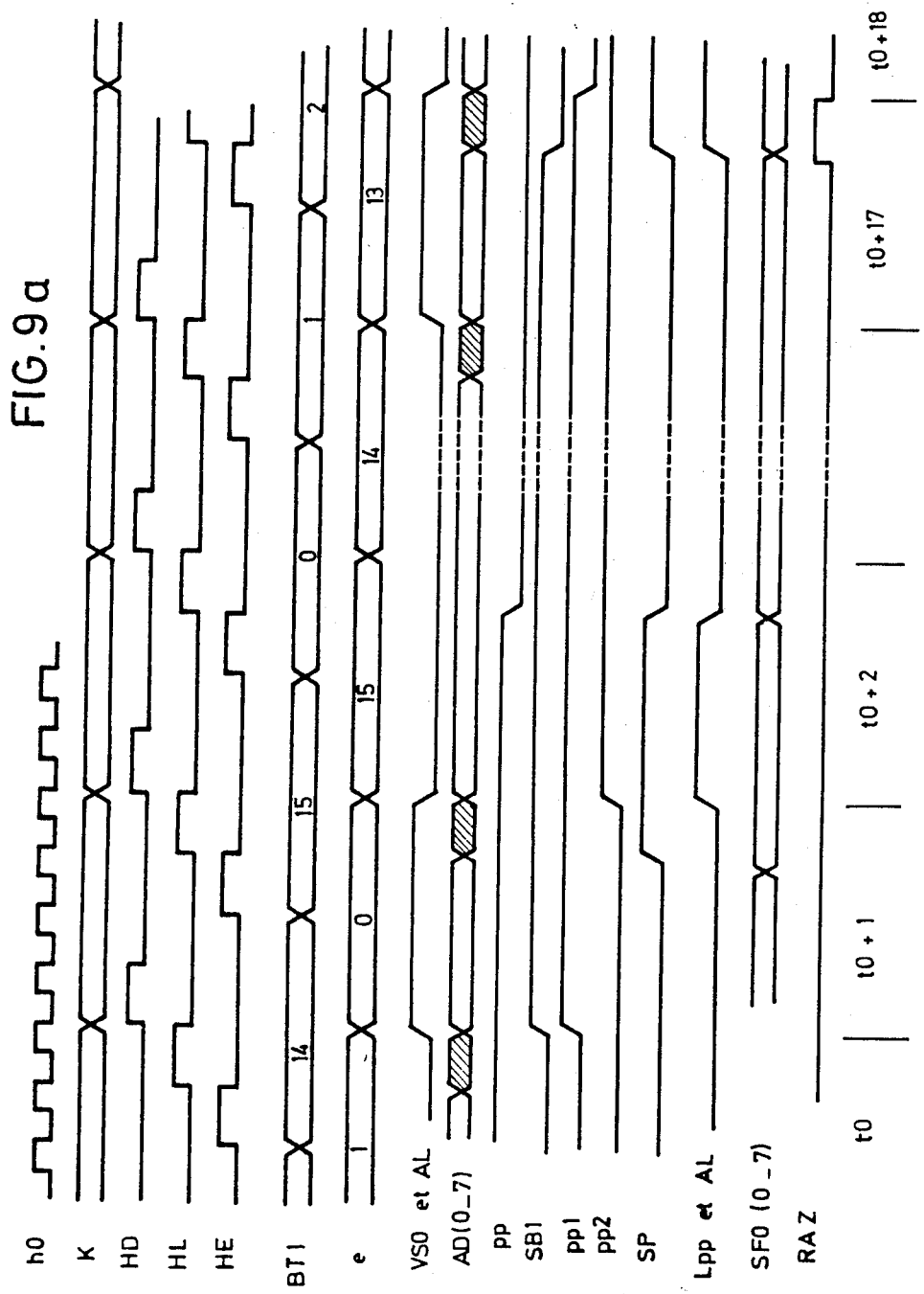

In FIG. 9b which illustrates, with FIG. 9a, a sixth operational case, five successive states of the file FC0 at byte times, t0 (e=14), t0+1 (e=15), t0+2 (e=0), t0+17 (e=15) and t0+18 (e=0) are shown. At time t0, the active zone ZA is full and contains the words A*, B, C*, D, etc., X, and the transit zone ZT contains two words P* and Q*. In the timing diagrams of FIG. 9a, we have also shown the byte times. At transition time t0, t0+1, the word A* is normally read through the multiplexer MX, then, towards the end of time t0+1, it is removed from the file by the signal VS0 set at "1" and replaced by the non-prioritized word B. Thus, at time t0+1, the word P* is entered into the zone ZA, but the word Q* remains in zone ZT.

In fact, at time t0, the signal PP is at "1" as well as the signal FNV0. When, at time t0+1, e takes on the value 15, the flip-flop B1 recopies the signal PP at "1", which sets flip-flop B2 also to "1", then flip-flop B3 as described above. The word B which has taken the place of word A*, not being prioritized, the signal SP goes to "1", such that the gate P4 maintains the signal Al at "1". Thus at time t0+2, at the leading edge of HL, the word B is removed by shifting of the file. During this time, the word Q* being in the transit zone ZT, the signal PP remained at "1", which maintained the state of flip-flop B1 and thus flip-flops B2 and B3. At time t0+3, not shown, as the word C* is prioritized, the signal PP goes to "0", which locks the gate P4. The word C* will thus not be removed on the leading edge HL during the time t0+3, but it will be read through the multiplexer MX at time t0+17, when e retakes the value 15 which causes the generation of the signal VS0 by the demultiplexer MDF.

In other respects, at the end of time t0+2, the word Q* is entered into the zone ZA while the zone ZT has become empty, which causes the signal PP to go to "0". We are thus brought back to the first operational case concerning the reading of the words. However, the flip-flop B1 has kept its enabled state, because the signal VS0 did not appear at time t0+17 and the gate P3 has remained blocked through the signal SP at level "0" indicating that the word C* is prioritized. At the beginning of time t0+17, the signals SB1, PP1 and PP2 are thus always at "1". The signal VS0 resets the flip-flop 1 to the rest state and the flip-flops B1 and B2 successively change state as we have described above in relation to the second case illustrated by FIGS. 5a and 5b.

In the preceding operational examples, it was assumed that during the operation, no new word entered into the file. It is obvious that the case can occur, at each byte time a word can be written if the packet entering is intended to go to the outgoing port of concern. A person skilled in the art, having been made aware of the particular sixth operational case, will certainly understand that the circuits CT0 to CT15 would treat them in the same fashion.

In the embodiment of the routing circuit shown in FIG. 3, the wire which transmits the signal P is duplicated on the corresponding inputs of files FC0 to FC15. When a packet entering a switch is intended for a single output port, a single wire would be perfectly suitable. When an entering packet is intended to be broadcast, that is to be routed to a number of output ports designated by the individual wires of bundle s, the single wire P implies that the packet is or is not prioritized for all the ports. For the case where we wish that one packet to be broadcast should be prioritized for some outgoing ports and not prioritized for others, it is necessary to provide sixteen individual wires p assigned to files FC0 to FC15, as the wires of bundle 2.

Of course, when the zone ZA of a file is full of prioritized packet addresses and others arrive, these cannot be transmitted. However, the design and the calculation of the traffic conditions allow one to bring these circumstances to very rare occurrence except during accident. On this subject, it should be known that the control unit UCC is used at each setting up at of the virtual circuits and thus knows the average load of each outgoing port. In the case of too numerous prioritized communications requested for an outgoing port, this control unit can delay the establishment of some of them to prevent bottlenecking.

We claim:

1. A system for switching information packets having two assigned levels of semantic priorities, said system comprising entering time multiplex lines, outgoing time multiplex lines, information packet switching means coupled between said entering and outgoing lines, a queueing file associated with each outgoing line, buffer memory means for storing a read address of a packet in said queueing file associated with an outgoing line which is to be used to transmit the packet, the read address being accompanied by a bit which defines a priority level of the packet, each of said queueing files comprising two zones coupled in series between an input and an output, means for writing only high priority level packets into the first zone only when the second zone is full, said writing occurring between the readings of said queueing files, and means for overwriting the read addresses of low priority level packets which were stored earlier than the oldest read address of high priority level packets which are present in the queueing file, the number of low priority packets being overwritten being equal, at a maximum, to the number of read addresses stored in the first zone.

2. A system in accordance with claim 1, and means for shifting said queueing file responsive to an overflow of a zone in the queueing file, with M read addresses in the first zone and more than M low priority level packet addresses between a read address which is present at an output of the queueing file and the oldest high priority level packet address present in the second zone after the read time of the file concerned, the shifting occurring at subsequent byte times.

3. A system in accordance with claim 1 and means for shifting the queueing responsive to a filling to an overflow of the second zone, with M read addresses in the first zone and less than M low priority level packet read addresses between a present address which is present at an output of the file queueing file and the oldest high level priority packet read address contained in the second zone, said shifting occurring after the read time of the file concerned, the file being subjected to a sufficient shift so that the high priority level packet read address is present at the output of the file, the shifts being done sequentially at the byte time rate after each reading time.

4. A system in accordance with one of the claims 1, 2, or 3 and a plurality of processing circuits, each queueing file being associated with a processing circuit and having a data input for receiving an address word and a priority level bit, said priority bit being "1" for a low priority level and "0" for a high priority level, a write enable input, a write clocking input, a data output means for generating an address word and a priority bit, a shift enable input, a read clock input, an output signal for indicating that the second zone if full and an output indicating that the first zone is not empty, each of said processing circuits comprising a first AND gate, one input of which receives the selection signal enabling writing in the file and a second input of which is connected to an output of a NAND gate, one input of which receives the priority bit and another input of which is connected to the output for indicating that the second zone if full, and an output of the first AND gate connected to the write enable input.

5. A system in accordance with claim 4 in which each of the processing circuits comprises a memory circuit, an OR gate, one input of which is enabled at each read time of the queueing file and a second input of which is connected to an output of a second AND gate, one input of said second AND gate receiving the priority bit present at the output of the queueing file and another input of which is connected to an output of said memory circuit having an input which is connected to the output indicating that the first zone is not empty, said memory circuit having a zero reset input which is enabled when an output indicating that the first zone is not empty is disabled and when the priority bit present at an output of the queueing file is at "0", and means for delaying a reset to zero by a period having one byte duration.

6. A system in accordance with one of the claims 1, 2, or 3 and means for assigning of one of the two priority levels to each packet at the same time that an input label is converted to an output label and a selection is made of one or many queueing files into which the read address of the packet is stored, the bit defining the priority level being supplied by means for carrying out a set conversion.

7. A system in accordance with claim 6, in which the conversion means supplying a priority level bit is common to all queueing files in which the packet read address is stored.

8. A system in accordance with claim 6, in which the conversion means selectively supplies the high priority level bit to some of the queueing files in which the packet read address is stored and supplies the low level priority to the others queueing files.

9. A system in accordance with claim 6, and means associated with said conversion means for loading control information concerning the conversion, selecting the queueing files, and assigning the priority levels is carried out in the conversion means at the time when said packet switching means is being set up.

10. A system in accordance with claim 4, in which one of the two priority levels is assigned to each packet at the same time that a input label conversion is made to an output label, and one or many queueing files is selected for storing a read address of the packet, the bit defining the priority level being supplied by the conversion means.

11. A system in accordance with claim 5, in which one of the two priority levels is assigned to each packet at the same time that there is a label conversion to an output label and that one or many queueing files are selected to store the read address of the packet, the bit defining the priority level being supplied by the conversion means.

12. A system in accordance with claim 10, in which the conversion means supplies a priority level bit in common to all queueing files in which the packet read address is stored.

13. A system in accordance with claim 11, in which the conversion means supplies a priority level bit in common to all queueing files in which the packet read address is stored.

14. A system in accordance with claim 10, in which the conversion means selectively supplies the high priority level bit to some of the queueing files in which the packet read address is stored, and supplies the low level priority to the others.

15. A system in accordance with claim 11, in which the conversion means selectively supplies the high priority level bit to some of the queueing files in which the packet read address is stored, and supplies the low level priority to the others.

16. A system in accordance with claim 7, in which the conversion means load control information concerning the conversion, selects the queueing files, and assigns the priority levels at the time of setting up a link.

17. A system in accordance with claim 8, in which the conversion means load control information concerning the conversions, selects the queueing files, and the assigns the priority levels at the time of setting up a link.

* * * * *